(No Model.)  3 Sheets—Sheet 1.

G. E. DOLTON.
CARRIAGE SPRING.

No. 292,419. Patented Jan. 22, 1884.

Attest:
Charles Pickles
Geo. H. Wheelock

Inventor:
George E. Dolton
By Knight Bro.
Attys (No Model.) 3 Sheets—Sheet 2.
G. E. DOLTON.
CARRIAGE SPRING.
No. 292,419. Patented Jan. 22, 1884.
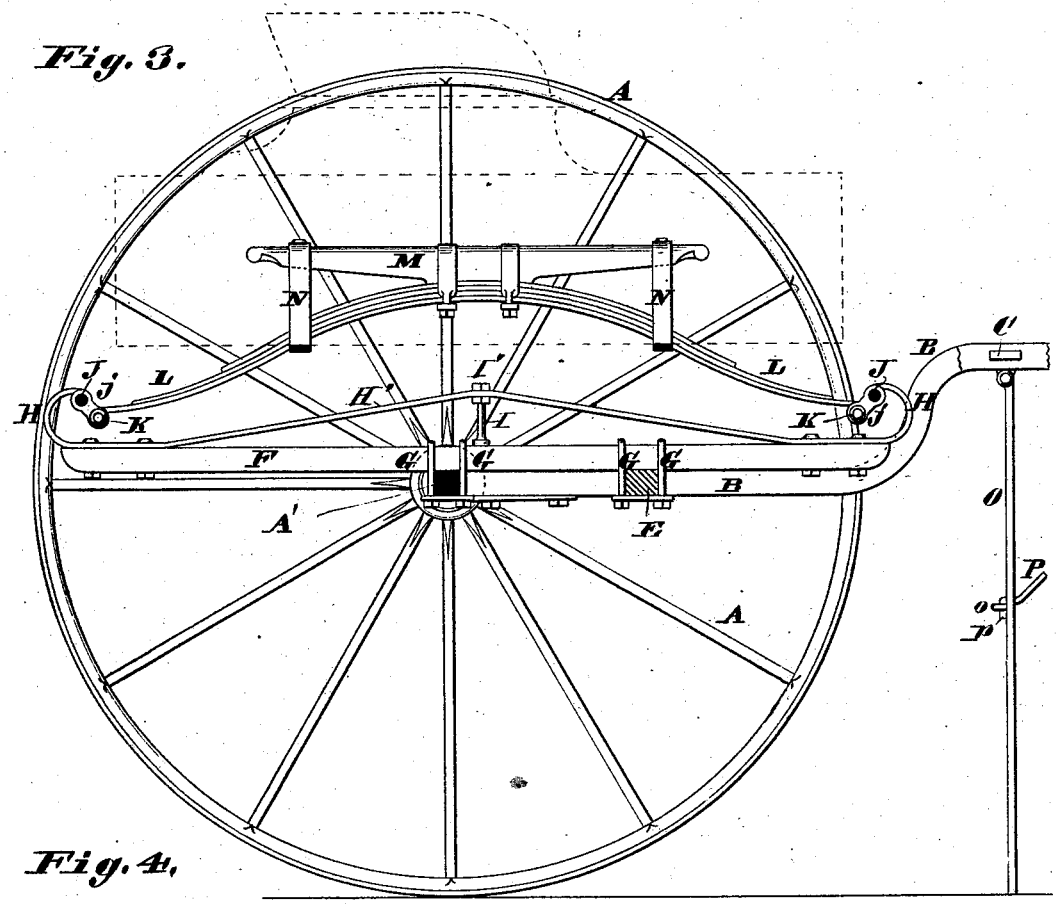
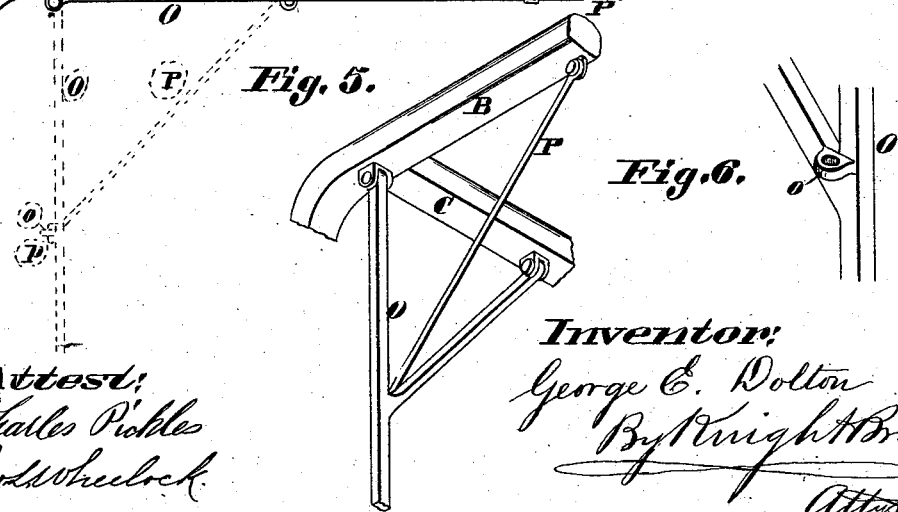
Attest:
Charles Pickles
Geo. L. Wheelock
Inventor:
George E. Dolton
By Knight Bros.
Atty.

(No Model.) 3 Sheets—Sheet 3.

G. E. DOLTON.
CARRIAGE SPRING.

No. 292,419. Patented Jan. 22, 1884.

Attest:
Charles Pickle
Geo. L. Wheelock

Inventor:
George E. Dolton
By Knight Bro.
Attys

UNITED STATES PATENT OFFICE.

GEORGE E. DOLTON, OF ST. LOUIS, MISSOURI, ASSIGNOR TO CAROLINE C. NITZSCHE, OF SAME PLACE.

CARRIAGE-SPRING.

SPECIFICATION forming part of Letters Patent No. 292,419, dated January 22, 1884.

Application filed August 7, 1883. (No model.)

*To all whom it may concern:*

Be it known that I, GEORGE E. DOLTON, of the city of St. Louis, in the State of Missouri, have invented a certain new and useful Improvement in Carriages, of which the following is a full, clear, and exact description, reference being had to the accompanying drawings, forming part of this specification.

The claims are referred to for statement of invention.

Figures 1, 2:
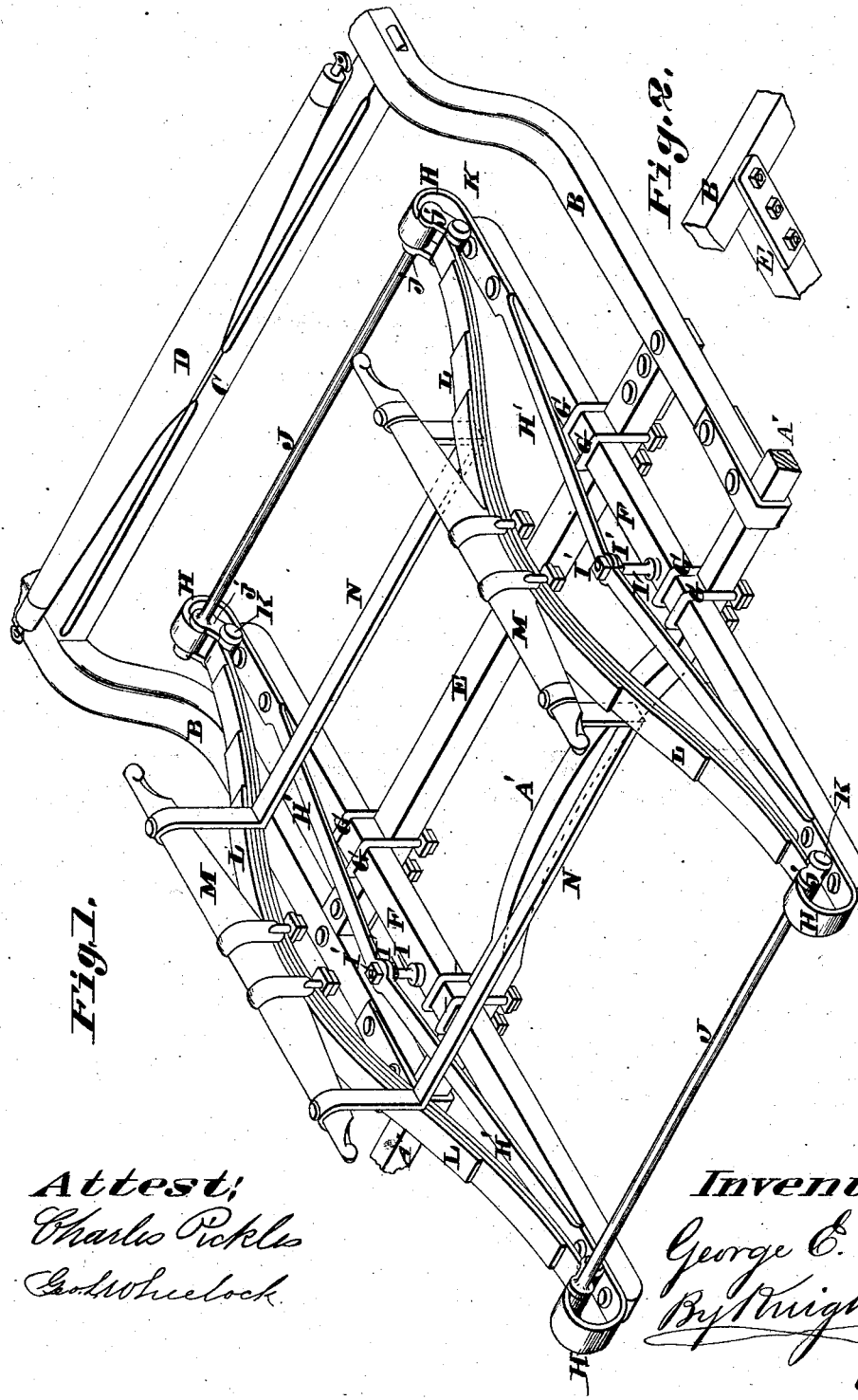
Figure 7:
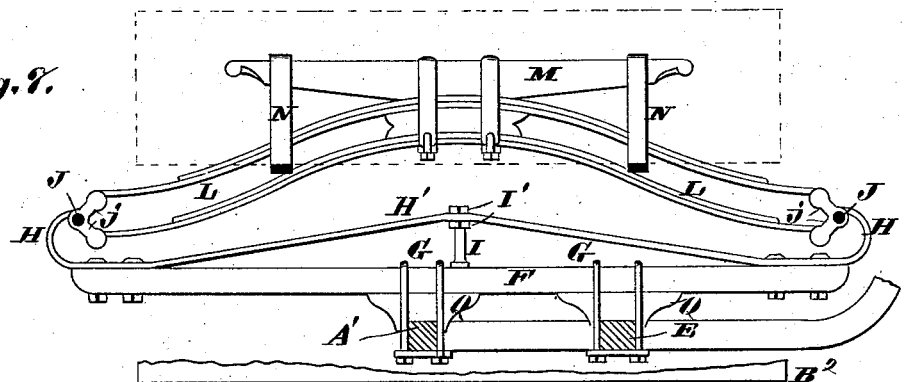
Figure 8:
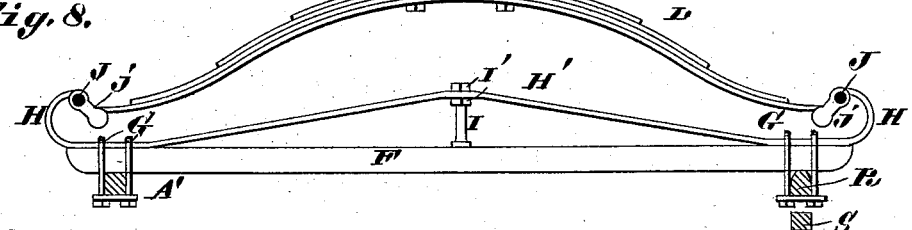
Figure 9:
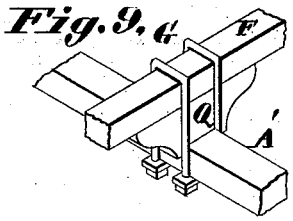
Figure 10:
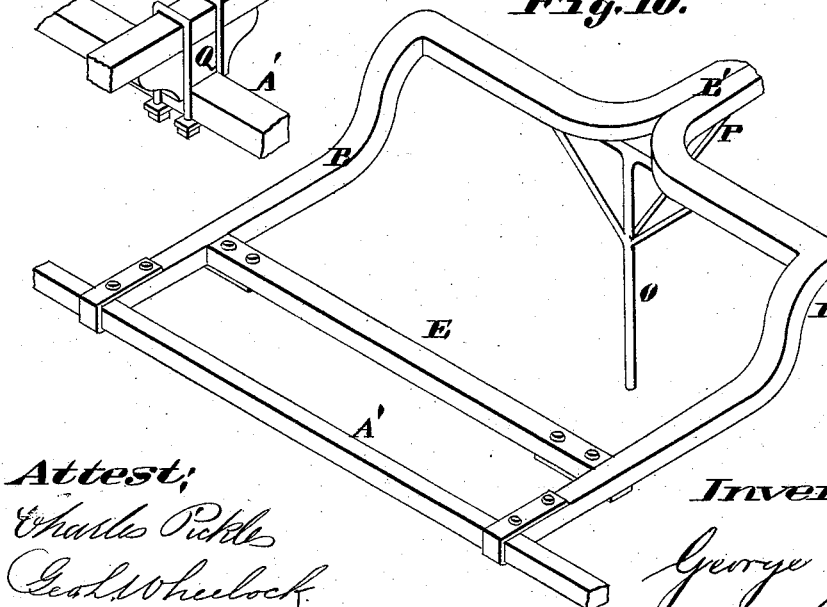

Figure 1 is a perspective view. Fig. 2 is a detail under perspective view. Fig. 3 is a longitudinal perspective view with the body dotted in. Figs. 4, 5, and 6 are details showing the shaft or pole support. Fig. 7 is a detail longitudinal section, showing the improvement with duplicate half-elliptic springs. Fig. 8 is a detail longitudinal section, showing the body attached directly to the spring. Fig. 9 is a detail perspective view, illustrating the manner of giving a tilting adjustment to the body to suit the height of the horse when the improvment is applied to two-wheeled vehicles. Fig. 10 is a detail perspective view, showing a pole applied to a two-wheeled vehicle.

I illustrate my improvement applied to a two-wheeled vehicle, for which, indeed, it is primarily intended. It is, however, applicable in its main features to a four-wheeled vehicle, as will be explained.

A represents a wheel, and A' the axle to which the shafts B are attached.

C is a cross-bar connecting the shafts, and to which the whiffletree D is fastened. So far the construction is as usual.

E is a second cross-bar, extending from shaft to shaft in front of the axle A'. The cross-bar E may be made fixed or movable. The axle and cross-bar E form the support of the body-hanging frame, now to be described. This frame has two sill-bars, F, that are attached by clips G or other suitable means to the axle A' and cross-bar E. The means of attachment should preferably allow the sills F to be adjusted longitudinally on the axle and cross-bar, as circumstances may require. Where the cross-bar E is immovable, it is evident that the sills must be adjusted by moving them endwise on both the axle and cross-bar; but where the cross-bar is made longitudinally adjustable, it may be moved with the sills rigidly attached thereto and the sills slipped on the axle.

Upon the sills I use a body-support constructed as follows:

H are spring-loops attached to the ends of the sills, and which may be connected together by a brace-bar, H', supported at the middle upon a post, I, that stands upon the sills. The upper end of the post passes through the brace and nuts I', that bear against the top and bottom of the brace, I, and which give means for adjustment, so as to keep the sill rigid and straight. By use of the brace I the sills may be made very light. The loops or goose-necks H are curved over, and have at the ends socket-bearings for the equalizer-bars J. The equalizer-bars have arms $j$, through whose ends pass the pintle pins or bolts K. Said pins or bolts pass through the eyes at the ends of the lower plate of the springs L.

M are the spring-bars clipped to the top of the springs, and connected at the ends by body loops or hangers N, that extend under the body of the vehicle, and to which the body is secured. The body is shown by dotted lines in Figs 3 and 7, and a part of it in full lines in Fig. 8.

Figs. 3 to 6 show the shaft-support. This consists of a leg, O, forked at the top and hinged to the shaft and cross-bar C, and held in a vertical position when in use by a brace, P, hinged to the shaft, and having at the free end a pin, $p$, that enters an eye, $o$, of the leg or support O. When the support is not in use, it, together with the brace P, may be folded up to the shaft and strapped fast. (See Fig. 4.)

In Fig. 7 the springs L are shown in duplicate half-elliptic form, the equalizer-shafts having two arms at each end, to which the ends of the springs L are connected.

Q are blocks interposed between the sills F and the axle and cross-bar E. By changing the size of the blocks the sills F may be adjusted vertically, and by using smaller blocks upon either the axle or the cross-bar the body may be inclined backward or forward, as may be required.

In Fig. 8 the body is attached directly to the springs, the loops or hangers N being dispensed with. This figure shows my improvement applied to a four-wheeled vehicle, the sills being clipped to the hind axle, A', and to the bolster R at front, the bolster having the usual fifth-wheel connection with the fore axle, S.

In Fig. 10 a pole, B', is shown in place of the shafts of the other figures, and the supporting-leg is somewhat modified, having two side braces in place of one.

The equalizer-bars may be dispensed with and simple links used for the support of the springs; but I much prefer to use the equalizers, because they tend to make a weight on either spring to be felt upon the other, and they hold the sills F and springs L parallel without any other provision, thus making a firm supporting-frame, whether attached to the rest of the vehicle or detached.

I have spoken of making the cross-bar E longitudinally adjustable as a means for the longitudinal adjustment of the sills. This cross-bar may also have means for vertical adjustment, to enable the body to be inclined forward or backward by lowering or raising the cross-bar.

I have shown two ways of hanging the body upon the springs; but I wish it to be understood that I do not confine myself to any particular means of hanging. nor to any particular style of body.

The body may be made adjustable on the springs by slipping it backward or forward on the hangers or loops N.

I claim—

1. A frame or body support consisting of sills F and side springs, L, connected to the adjustable sills and to the body.

2. The combination of sills F, goose-necks H, and springs L, connected to the body.

3. The combination, in a body-supporting frame for vehicles, of springs L, connected to the body at or near their middle, and connected at the ends to sills F, substantially as set forth.

4. A body-supporting frame composed of sills F and springs connected together and made longitudinally adjustable upon the axle and shaft or pole frame.

5. The combination, in a two-wheeled vehicle, of the axle A', cross-bar E, adjusting-blocks Q, sills F, and side springs connected to the sills and to the body.

6. The sills F, connected with springs by goose-necks at the ends, and having truss or brace H', substantially as described and shown.

7. The combination of sills F and truss or brace H', adjusting post and nuts I I', goose-necks H, and springs connected to the goose-necks and to the body.

8. The combination of sills F, goose-necks H, equalizers J, and springs L, forming a body-supporting frame for vehicles.

9. The combination, in a two-wheeled vehicle, of the side bars or shafts, B, cross-bar E, axle A', sills F, goose-necks H, and springs L, connected to the goose-necks and to the body of the vehicle.

10. The combination of side bars or shafts, B, cross-bar E, axle A', sills F, secured to said cross-bar and axle, trusses H' I I', goose-necks H, equalizers J, and springs L, secured to the body in any suitable manner.

11. The combination of side bars or shafts, B, cross-bar E, axle A', sills F secured to said cross-bar and axle, goose-necks H, trusses H' I I', equalizers J, springs L, spring-bars M, and hangers N, extending transversely from one spring-bar to the other.

GEORGE E. DOLTON.

Witnesses:
SAML. KNIGHT.
FLORA G. FERGUSON.